Figure 1:
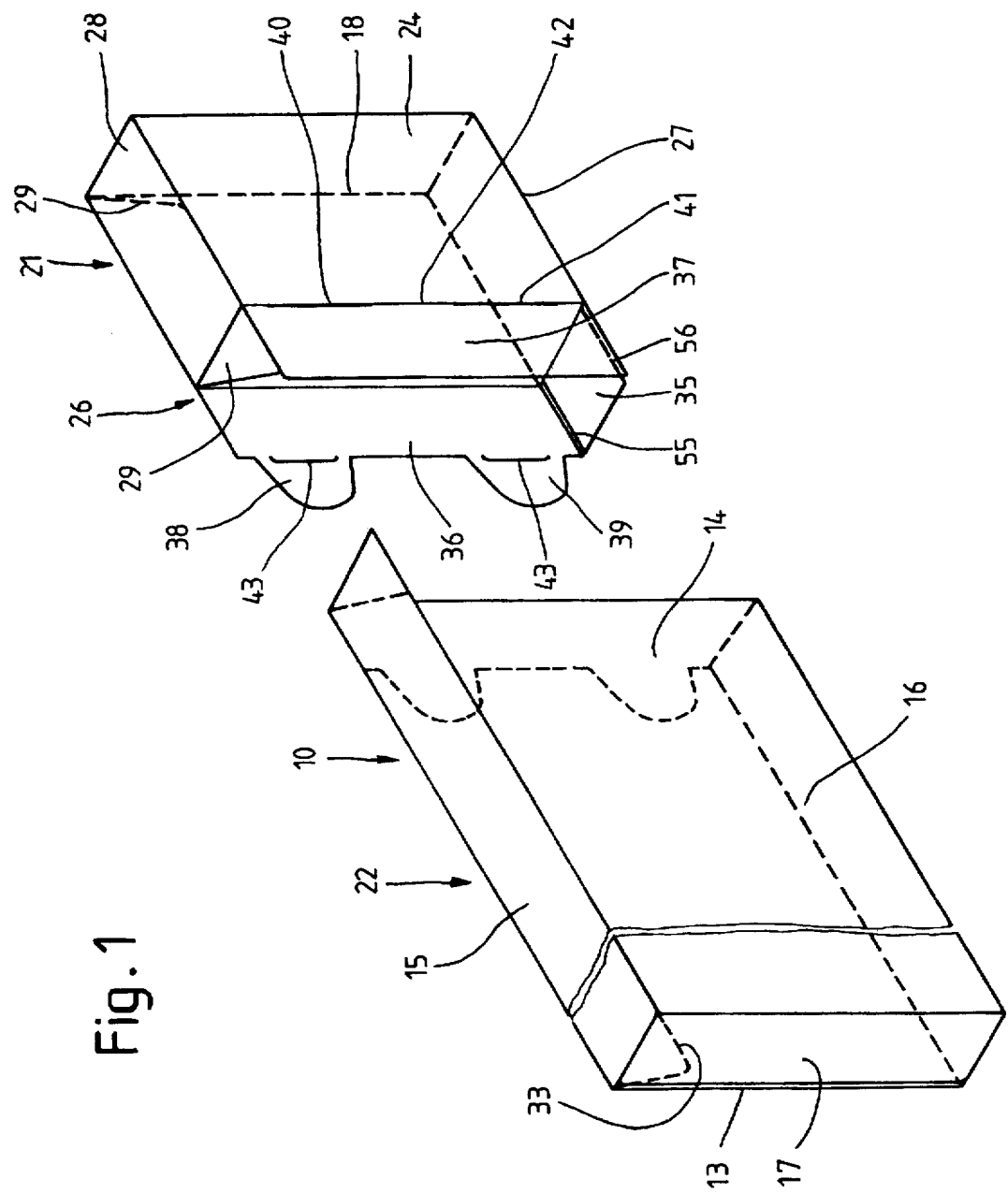

United States Patent [19]
Focke et al.

[11] Patent Number: 5,669,493
[45] Date of Patent: Sep. 23, 1997

[54] CARTON FOR CIGARETTE PACKS

[75] Inventors: Heinz Focke, Verden; Henry Buse, Visselhövede, both of Germany

[73] Assignee: Focke & Co. (GmbH & Co), Germany

[21] Appl. No.: 444,037

[22] Filed: May 18, 1995

[30] Foreign Application Priority Data

May 31, 1994 [DE] Germany ............. 44 18 821.8

[51] Int. Cl.⁶ .................. B65D 85/10; B65D 5/54
[52] U.S. Cl. .................. 206/271; 206/264; 229/101.2
[58] Field of Search .................. 206/271, 256, 206/268, 264; 229/101.2, 101

[56] References Cited

U.S. PATENT DOCUMENTS

| | | | |
|---|---|---|---|
| 1,772,625 | 8/1930 | Caufield | 229/101.2 |
| 2,074,451 | 3/1937 | Berberian | |
| 2,112,013 | 3/1938 | Chalmers | 206/264 |
| 2,407,415 | 9/1946 | Graziaro | 229/101 |
| 3,167,240 | 1/1965 | Collura et al. | 229/101.2 |
| 3,680,766 | 8/1972 | Collura et al. | 229/101.2 |
| 4,932,534 | 6/1990 | Focke et al. | |
| 5,158,178 | 10/1992 | Cobler | |
| 5,205,403 | 4/1993 | DeBlasio | |

FOREIGN PATENT DOCUMENTS

| | | | |
|---|---|---|---|
| 1183269 | 7/1959 | France | 229/101.2 |
| 2342208 | 9/1977 | France | |
| 2644334 | 10/1976 | Germany | |
| 4239258 | 11/1992 | Germany | |
| 835451 | 12/1957 | United Kingdom | |

*Primary Examiner*—Bryon P. Gehman
*Attorney, Agent, or Firm*—Abelman, Frayne & Schwab

[57] ABSTRACT

A bundle pack, or carton, for cigarette packs that is made of thin cardboard is provided with perforations and/or die-cut lines that allow separation of an end portion of the carton, the tabs that can be separated end portion of the carton having folded to form a smaller reusable box adapted to contain and protect at least one standard pack of cigarettes.

13 Claims, 4 Drawing Sheets

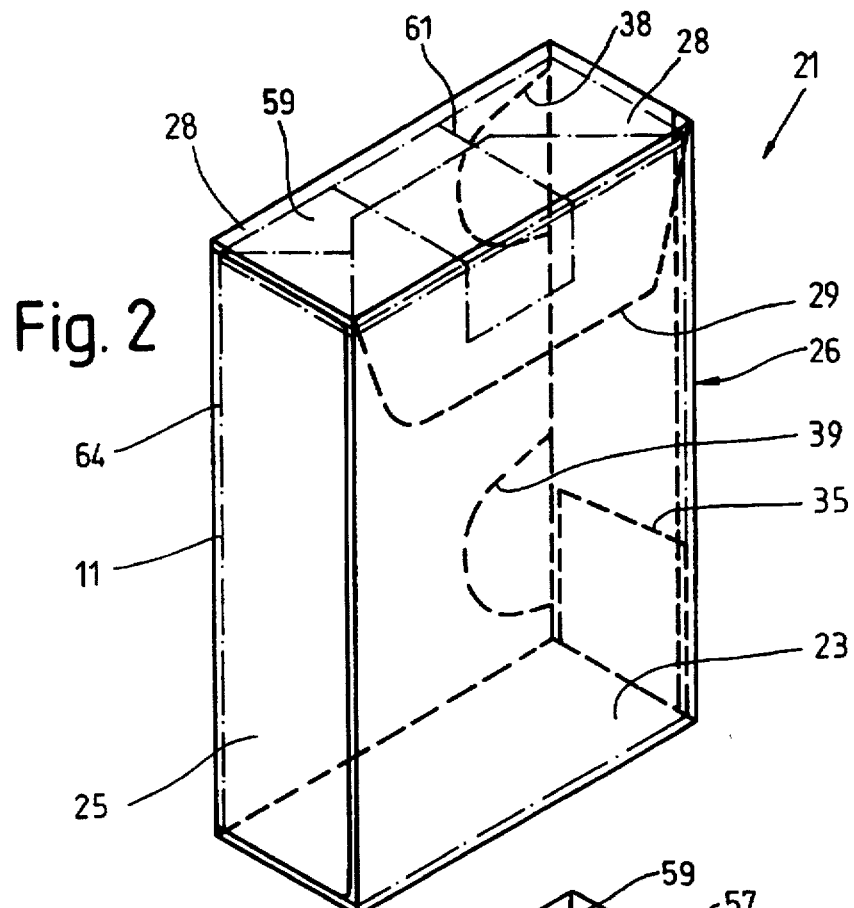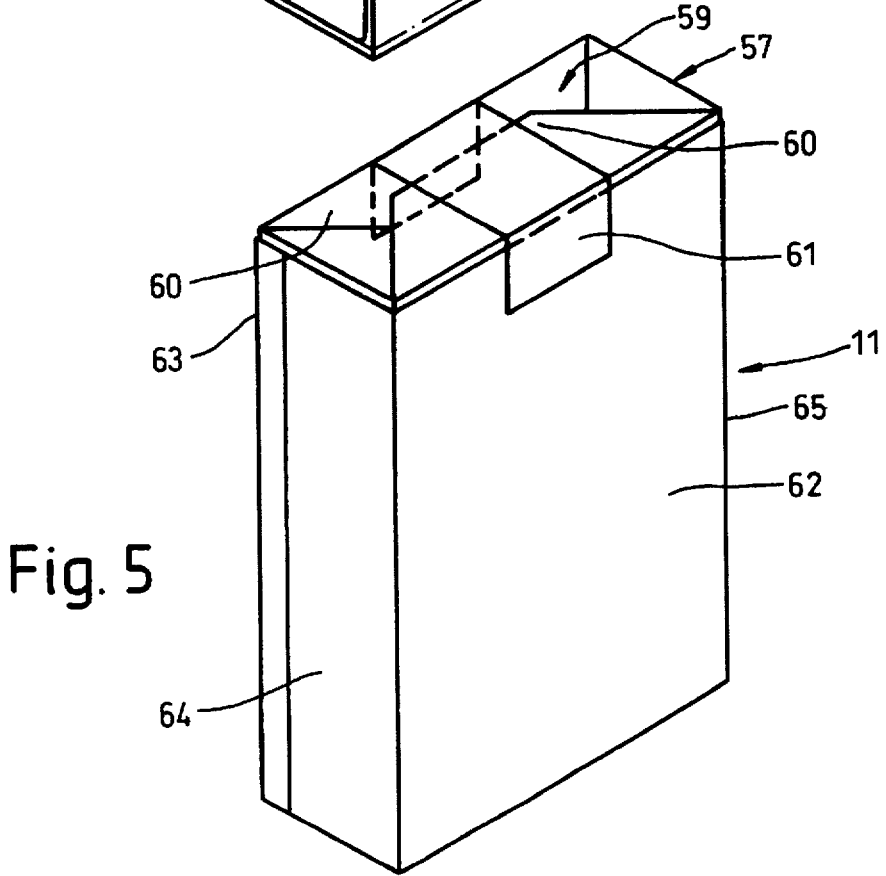

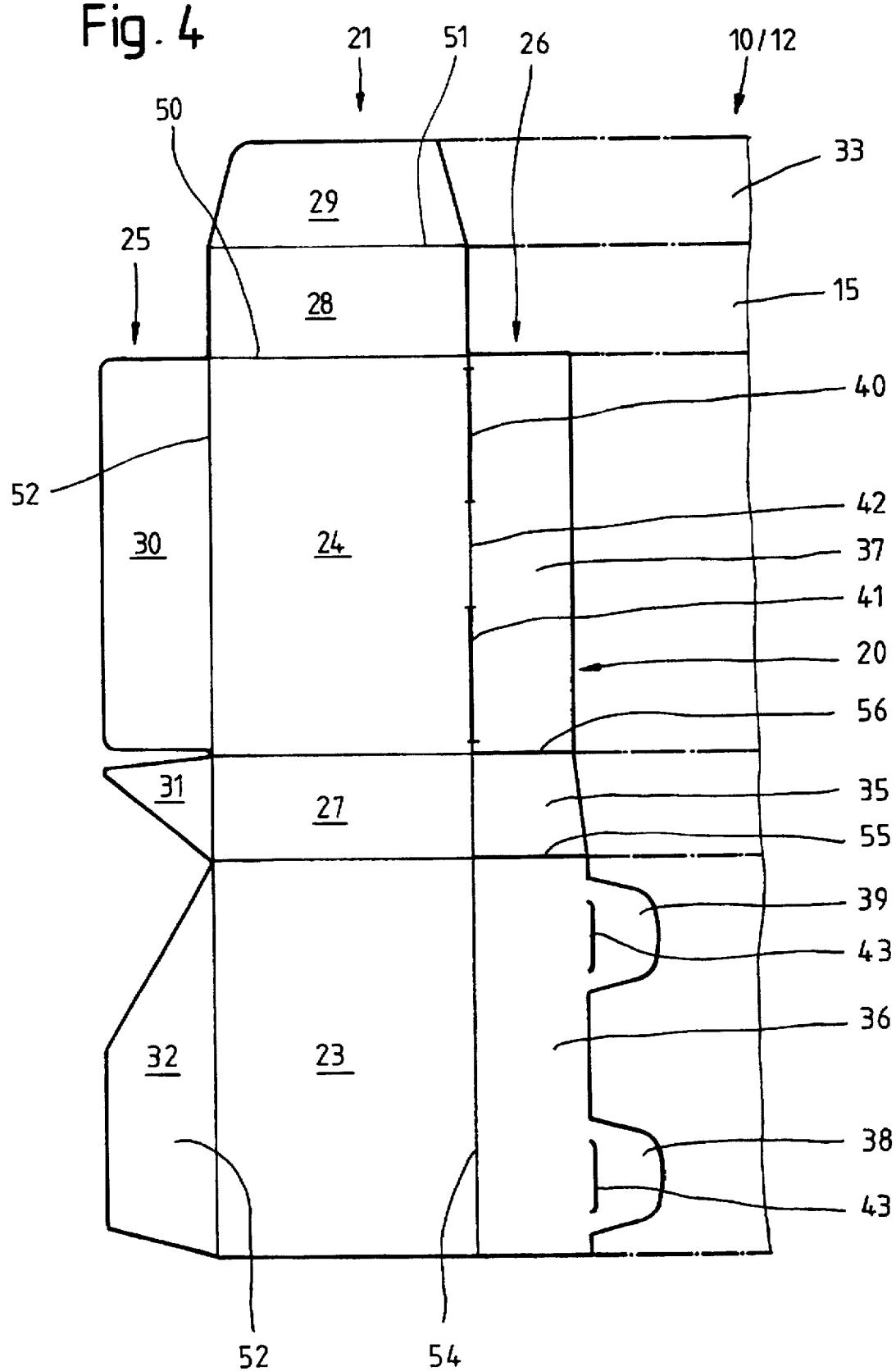

CARTON FOR CIGARETTE PACKS

The invention relates to a bundle, or carton, pack for a group of cigarette packs a —so-called cigarette stick—being an outer wrapper which encloses the group of the cigarette packs and consists of (thin) cardboard or similar packaging material, it being possible for a sub-region of the outer wrapper to be severed, by punch and/or perforation lines, from the rest of the outer wrapper, namely from a residual bundle pack.

The invention is concerned with such bundle packs which consist of thin cardboard or another foldable material with a certain inherent rigidity. The cigarette packs are preferably soft-carton packs which are known throughout the world.

The "cigarette stick", or carton, usually contains ten cigarette packs. Dividable bundle packs, however, are also known, in the case of which each part-bundle pack receives five cigarette packs located one beside the other. The result is then an individual bundle pack for five cigarette packs (U.S. Pat. No. 4,932,534).

The object of the invention is to develop a further, additional possible use for the bundle packs or the outer wrapper.

In order to achieve this object, the bundle pack according to the invention is characterized in that the part severed from the residual bundle pack can be folded to give a re-closeable box which, in terms of width, depth and height, corresponds to the dimensions of a single cigarette pack or of two cigarette packs resting one against the other by means of their large surfaces (front and/or rear surface), the intention being, in order to complete the box, for folding tabs to be folded in order to form a box side wall.

In accordance with the proposal of the invention, the bundle pack is accordingly divided when it is used, such that at least one small-format box is made from the packaging material of the outer wrapper. Preferably, said box is designed and configured such that it can serve to receive a single cigarette pack.

Consequently, the box is particularly suitable for receiving soft packs of soft-carton packs. This type of pack, which is favourable in material terms, is subject to the disadvantage of low dimensional stability and the resulting risk of undesired deformation to the cigarettes. By using the box which consists, in particular, of thin cardboard and is formed from the bundle pack, a stable outer pack is obtained for the soft pack. Said outer pack is suitable for multiple usage, with the result that, gradually, the entire contents of the bundle pack can be inserted into the box as a stable outer pack.

According to the invention, the outer wrapper of the bundle pack directly forms the box by means of a sub-region and/or end region, in particular in the case of bundle packs or part-bundle packs having a format which corresponds in cross-section to the dimensions of a cigarette pack. For the production of the box, merely an end region of the closed (part-) bundle pack is severed. This thus results in folding tabs in order to form a side wall of the box. Said tabs are folded into the position corresponding to the side wall and are connected to one another, preferably by push-in tongues. Consequently, the box, which is of the precise size for the cigarette pack, is formed with a small number of manipulations.

Figure 3:
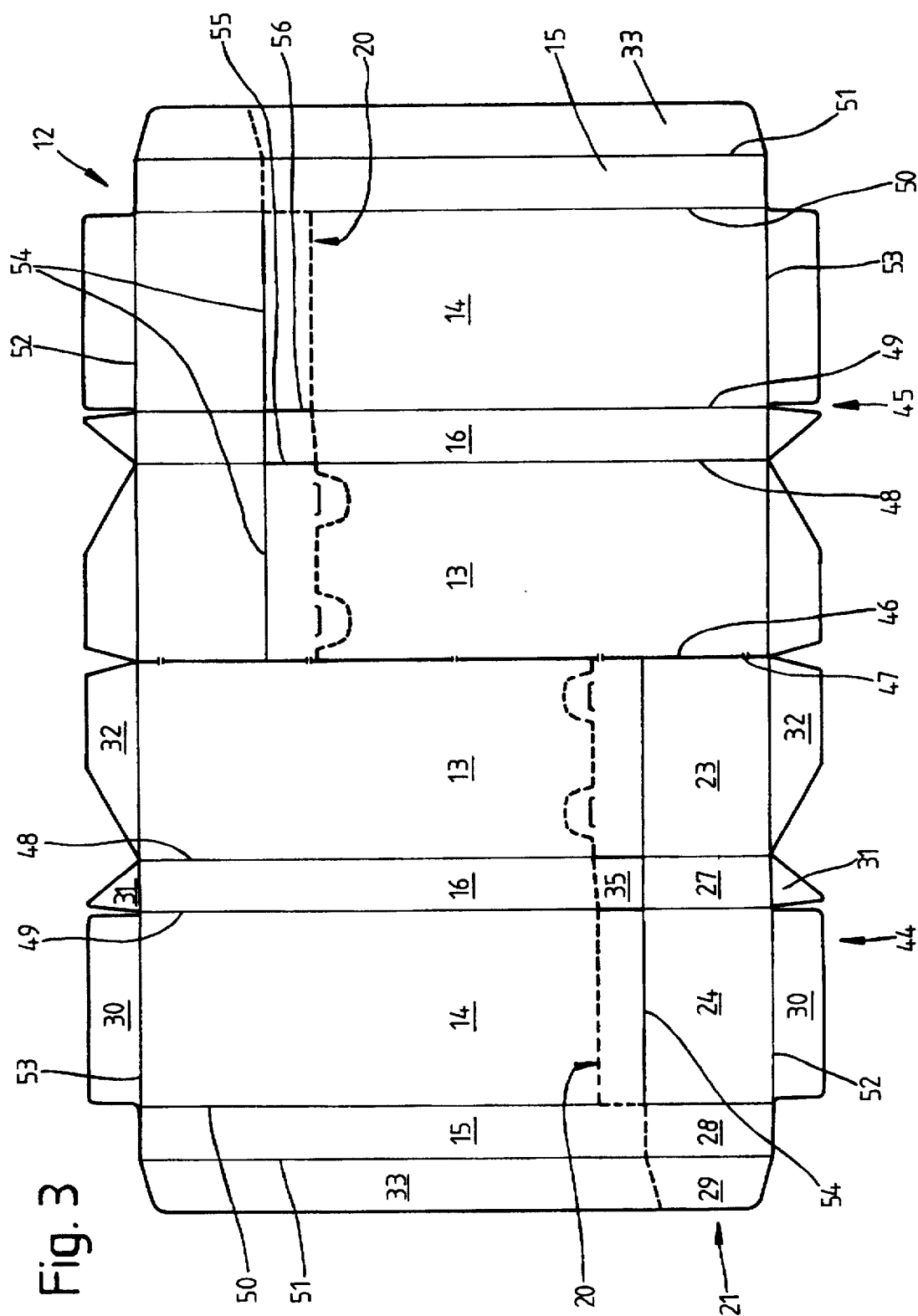

Further details of the invention relate to the design of the outer wrapper of the bundle pack and to the configuration of the box which is to be produced therefrom. Exemplary embodiments of the invention are explained in more detail hereinbelow with reference to the drawings, in which:

FIG. 1 shows a perspective representation of a (part-) bundle pack after a part for a box has been severed, FIG. 2 likewise shows, on an enlarged scale, a perspective representation of a ready-folded box with a cigarette pack, FIG. 3 shows a spread-out blank for the outer wrapper of a bundle pack, FIG. 4 shows, on an enlarged scale, a single blank for a box, and FIG. 5 shows a perspective representation of a folded soft-carton pack for cigarettes.

The exemplary embodiments represented in the drawings are based on a bundle pack 10 for cigarette packs 11. The latter are preferably soft packs or soft-carton packs, as are shown, for example, in FIG. 5. This type of pack usually comprises an inner wrapper 57, which consists of tin foil or paper and is intended for a cigarette group, and a carton 58 which is open at the top and consists of paper. Consequently, this type of pack has a low dimensional stability. The inner wrapper 57 with cigarette group—a cigarette block—projects out of the carton 58 slightly at the top. The inner wrapper 57 forms an upper wall 59 from mutually partially overlapping folding tabs 60 of the inner wrapper 57. The folding tabs 60, which are usually not connected to one another by adhesive bonding, are held in the closed position by a revenue stamp 61 extending transversely over the end surface and/or upper wall 59. The upper wall 59 is usually used as the removal opening, in that parts of the folding tabs 60 are severed in order to use the cigarette pack 11.

The cigarette pack 11 represented in FIG. 5 by way of example is designed in the form of a cuboid with a large-surface-area front side 62 and corresponding rear side 63. Mutually opposite side surfaces 64, 65 are narrow in accordance with the width of the cigarette group.

The bundle pack 10 receives a plurality of cigarette packs 11 of this or of a similar type, namely either five or ten cigarette packs 11. Said cigarette packs are enclosed by an outer wrapper 12 consisting of foldable material of a certain dimensional stability. In particular, the outer wrapper 12 consists of thin cardboard.

In the present case, the bundle pack 10 is configured such that it encloses the group of cigarette packs 11 on all sides. The bundle pack 10 and the outer wrapper 12 thereof accordingly form front wall 13 and rear wall 14 with a rectangular configuration, and furthermore narrow, elongate side walls 15, 16 and relatively small, mutually opposite end walls 17 and 18.

In the case of exemplary embodiment according to FIG. 1, the bundle pack 10 serves to receive five cigarette packs 11 which are arranged one beside the other. The length of the front wall 13 and rear wall 14 and of the side walls 15, 16 accordingly corresponds to the dimension of five cigarette packs 11 which are positioned one beside the other by means of their upright, narrow side surfaces 64, 65. Said cigarette packs are arranged within the bundle pack 10 such that opening sides, namely the upper walls 59, which are formed by the inner wrapper 57 consisting of tin foil or paper, are directed towards the side wall 15 of the outer wrapper 12, said side wall 15 being at the top in FIG. 1.

A special feature consists in the fact that, as a result of suitable configuration of the outer wrapper 12, namely by the provision of a perforation line 20, a section of the bundle pack 10, namely a box 21, can be separated from a remaining residual bundle pack 22. The separation takes place as result of the corresponding design and arrangement of the perforation line 20 in the region of the closed and finished bundle pack 10, such that the box 21 which is severed from the residual bundle pack 22 corresponds to the dimensions of a cigarette pack 11. In addition, folding tabs are severed from the region of the residual bundle pack 22, which tabs serve to complete the box 21, namely in order to close an open side of the same.

The box 21 which is formed by severing from the bundle pack 10 serves as outer wrapper of the cigarette pack 11 until the latter is used. In this arrangement, the box 21 is intended to serve as a stabilizing and protective outer wrapper for a plurality of, or for all the, cigarette packs 11 of the bundle pack.

In the present case, the box 21 forms a wrapper for the cigarette pack 11 on all sides thereof, that is to say with box front wall 23, box rear wall 24, box side walls 25, 26 and a base wall 27. A closure wall 28 with push-in flap 29 is provided on the upper side. These make it possible for the box 21 to be opened and re-closed a number of times, in order to remove cigarettes. In this arrangement, the push-in flap 29 is pushed in between the cigarette pack 11 and box front wall 23. The closure wall 28 and push-in flap 29 are connected to the box rear wall 24.

A box side wall 25 corresponds to an end wall 18 of the bundle pack 10. Said end wall 18 or box side wall 25 comprises end wall tabs 30, 31 and 32 of known design, namely with a rectangular outer end wall tab 30, with an approximately triangular small inner end wall tab 31 and with the trapezoidal inner end wall tab 32. The base wall 27 of the box 21 corresponds to the (lower) side wall 16 of the bundle pack 10. Said side wall 16 is arranged within the blank for the outer wrapper 12, between the front wall 13 and rear wall 14. The closure wall 28 and push-in flap 29 of the box 21 are parts of corresponding elements of the bundle pack 10, namely of the side wall 15 with a closure strip 33 arranged thereon.

In order to form the box side wall 26 which is directed towards the residual bundle pack 22, use is made of folding tabs which have also been severed, namely a lower corner tab 35 as part of the side wall 16 of the bundle pack 10. Furthermore, side tabs 36 and 37 are formed. These are parts of the front wall 13 and rear wall 14 of the bundle pack 10. The side tab 36 is located on the outside and serves as an outer covering for the box side wall 26. In order to complete the box 21 severed from the bundle pack 10, then, accordingly, the corner tab 35 is first of all folded into an upright position (FIG. 1), which is followed by the side tab 37 and, finally, the side tab 36 each being folded through 90°.

The two side tabs 36, 37 may be connected to one another, for example by activatable adhesive points (not shown). In the present case, a push-in connection is selected as solution for this. For this purpose, push-in tongues 38, 39 are arranged on a free longitudinal border of the outer side tab 36. Upon completion of the box 21, said push-in tongues are angled off and introduced into slits 40, 41. The latter are formed in the region of an upright box edge 42, between the box rear wall 24 and the adjoining side tab 37. The slits 40, 41 are dimensioned such that the push-in tongues 38, 39, which are of an arcuate contour, can enter into the slits 40, 41. In this arrangement, the push-in tongues 38, 39 are preferably folded over through 90°, with the result that they rest against the inner side of the box rear wall 24.

The push-in tongues 38, 39 are formed, by way of the correspondingly shaped perforation line 20, from the front wall 13 of the bundle pack 10. In the present case, a punching 43 is provided in the region of each push-in tongue 38, 39. The punching 43 facilitates the folding, necessary during the production of box 21, of the push-in tongues 38, 39. Moreover, the U-shaped design of the punching 43 provides a stop for precise positioning of the push-in tongues 38, 39 in the slits 40, 41.

The bundle 10 according to FIG. 1 may be a part-bundle pack. This alternative is shown in FIG. 3. A blank, here in one piece, for the outer wrapper 12 is designed such that two part-bundle packs 44, 45 may be produced, which part-bundle packs first of all form a unit, but can be separated for use or even before this. Each part-bundle pack 44, 45 is, then, of the size and shape of the bundle pack 10 according to FIG. 1.

The part-bundle packs 44, 45 are connected to one another in the region of a punched separation line 46. Said separation line comprises punchings which are interrupted by residual connections 47. The web-like residual connections 47 are destroyed, namely severed, in order to separate the part-bundle packs 44, 45.

The blank for the outer wrapper 12 is, for each part-bundle pack 44, 45, preformed, by longitudinal folding lines 48, 49, 50, 51, into elongate zones for forming walls of the bundle pack 10 or of the part-bundle packs 44, 45. The longitudinal folding lines 49, 50 bound the lower side wall 16 of the bundle pack 10 between the front wall 13 and rear wall 14. The longitudinal folding lines 50, 51 bound the upper side wall 15 which is joined by the closure strip 33. The longitudinal folding lines 48 . . . 51 form corresponding transversely directed edges of the box 21 after severing from the bundle pack 10.

Transverse folding lines 52, 53 separate the front wall 13, rear wall 14 and side wall 16 from the end wall tabs 30, 31, 32. The transverse folding line 52 forms upright front and rear box edges parallel to the box edge 42. This is likewise preformed by a further transverse folding line 54 in the region of the blank for the bundle pack 10 or part-bundle pack 44, 45.

Each blank for a part-bundle pack 44, 45 is provided with a perforation line 20 for bounding a region for a box 21. Accordingly, a box 21 can be severed in the described manner from each folded part-bundle pack 44, 45 and completed by folding operations. The boxes 21 or those regions of the outer wrapper 12 which are marked for this purpose are, in the exemplary FIG. 3, positioned diametrically opposite one another. One box 21—including contents—can be severed in the described manner from each of the part-bundle packs 44, 45.

The continuous, uninterrupted perforation line 20 corresponds to the contour of a blank for the box 21. Accordingly, it extends from the free border of the closure strip 33 as far as the separation line 46, that is to say over the full width of the blank of a part-bundle pack 44, 45.

In addition, in the case of the present exemplary embodiment, two parallel punch cuts 55, 56 are provided. These separate off the lower corner tab 35 of the box 21 from the adjacent side tabs 36, 37. The punch cuts 55, 56 may be produced with the perforation line 20 in one operating cycle. Furthermore, in the same operating cycle, the slits 40, 41 may be formed by punching. In the present case, the outer side tab 36 is of a somewhat greater width than the inner side tab 37 by virtue of the corresponding progression of the perforation line 20.

Handling of the box 21 after severing and completion is such that, when the closure wall 28 (with push-in flap 29) is raised up, there is free access to the upper wall 59 of the cigarette pack 11. The cigarettes may then be removed from a permanent opening formed by severing parts of the folding tabs 60. When the box 21 is closed, the opening in the upper wall 59 is covered over, with the result that the cigarette pack 11 is closed by the closure wall 28.

The bundle pack 10 may alternatively be configured such that, for example, two cigarette packs 11 located one beside the other are severed from the bundle pack with a correspondingly dimensioned box. In this arrangement, the two cigarette packs may rest against one another by means of their large surfaces, that is to say by means of the front side 62 and rear side 63.

We claim:

1. A cigarette carton (10) containing a plurality of cigarette packs (11), the carton formed from thin foldable cardboard and having front and rear walls (13, 14), top and bottom walls (15,16), a closure strip (33) extending from the top wall and bonded to the rear wall, all of said walls defined by longitudinal fold lines, and sealed end walls (17, 18), the carton further comprising:
    (a) a first transverse fold line (54) extending across the front and rear walls (13, 14) and the intermediate bottom wall (16) and spaced inwardly from one of said end walls of the carton a distance equal to the width of one of said cigarette packs;
    (b) a first transverse perforated parting line (20) extending across the front and rear walls (13, 14) and intermediate bottom wall (16) and spaced inwardly of the carton from the first transverse fold line a distance equal to the width of one of said end walls;
    (c) punch-cut lines (55, 56) extending between the first transverse fold line (54) and first perforated parting line (20) and along longitudinal fold lines defining the bottom wall;
    (d) a push-in tongue (38 or 39) defined by perforations in the carton rear wall (13), the push-in tongue extending inwardly toward the center of the carton from the first perforated parting line (20);
    (e) a slit (40 or 41) in the first fold line (54) on the front wall and positioned for receiving the push-in tongue (38 or 39);
    (f) a second perforated parting line extending across the top wall (15) and closure strip (33) aligned with the first fold line (54); and
    (g) a third perforated parting line extending between the first and second perforated parting lines and coincident with the longitudinal fold line between the front and top walls (14, 15), whereby the carton is separable along the perforated parting lines into a residual carton section and a resealable box section.

2. The carton of claim 1 where the cigarette packs are soft packs and the tops of said packs are aligned with the top wall of the carton and said closure strip.

3. The carton of claim 1 where the first parting line and first transverse fold line define a side tab (36, 37) in each of the front and rear walls of the carton and a bottom tab (35) in the bottom wall of the carton.

4. The carton of claim 3 in which the push-in tongue extending longitudinally from one of the side tabs is arcuately tapered, and the corresponding slit aligned with the fold line defining the opposite side tab is punch-cut.

5. The carton of claim 4 where the push-in tongue is configured to closely fit within the slit to a position between the adjacent wall and one of said cigarette packs contained in said resealable box section.

6. The carton of claim 5 which further comprises a transverse punch-cut slit at the base of the push-in tongue.

7. The carton of claim 6 where the punch-cut slit is in the form of a shallow U-shape.

8. The carton of claim 1 containing five cigarette packs where the tops of the packs are aligned with the top wall of the carton and the packs are aligned in side-by-side relation.

9. The carton of claim 8 in which each of the sealed ends of the carton are formed from end face tabs.

10. A carton containing a plurality of cigarette packs, said carton having four side walls and opposing end walls formed from a wrapper of lightweight cardboard, said carton characterized by:
    (a) a plurality of interconnected transverse parting lines that divide the carton into a residual carton section and a separable re-closeable box section, said box section configured to securely contain one or two of said cigarette packs;
    (b) said parting lines being spaced inwardly of the carton from one end wall of the carton a distance equal to at least the width of one of said cigarette packs;
    (c) a plurality of score lines extending transversely across the walls of the box section and spaced inwardly of the end wall of the box section a distance equal to the width of one of said cigarette packs;
    (d) said parting lines defining at least one side tab formed in a pair of opposing side walls of the carton and a foldable to close the end of the box section after its separation from the residual carton section.

11. The carton of claim 10 where the parting lines are comprised of punch-cut lines and perforation lines.

12. A pair of cigarette cartons, each carton containing five cigarette packs and each carton formed from thin foldable cardboard and having front and rear walls (13, 14), top and bottom walls (15, 16), a closure strip (33) extending from the top wall and bonded to the rear wall, all of said walls defined by longitudinal fold lines, and sealed end walls (17, 18), each carton further comprising:
    (a) a first transverse fold line (54) extending across the front and rear walls (13, 14) and the intermediate bottom wall (16) and spaced inwardly from one of said end walls of the carton a distance equal to the width of one of said cigarette packs;
    (b) a first transverse perforated parting line (20) extending across the front and rear walls (13, 14) and intermediate bottom wall (16) and spaced inwardly of the carton from the first transverse fold line a distance equal to the width of one of said end walls;
    (c) punch-cut lines (55, 56) extending between the first transverse fold line (54) and first perforated parting line (20) and along longitudinal fold lines defining the bottom wall;
    (d) a push-in tongue (38 or 39) defined by perforations in the carton rear wall (13), the push-in tongue extending inwardly toward the center of the carton from the first perforated parting line (20);
    (e) a slit (40 or 41) in the first fold line (54) on the front wall and positioned for receiving the push-in tongue (38 or 39);
    (f) a second perforated parting line extending across the top wall (15) and closure strip (33) aligned with the first fold line (54); and
    (g) a third perforated parting line extending between the first and second perforated parting lines and coincident with the longitudinal fold line between the front and top walls (14, 15), said pair of cartons joined along a severance line corresponding to the longitudinal edge of the rear wall of each of said cartons, whereby each of said cartons is separable along the perforated parting lines into a residual carton section and a resealable box section.

13. The cigarette cartons of claim 12 where the parting lines of the respective cartons are inwardly spaced from opposite ends of the respective cartons.

* * * * *